July 16, 1929.  L. CLANTON  1,721,205
FISH SNARE
Filed May 26, 1928  2 Sheets-Sheet 1
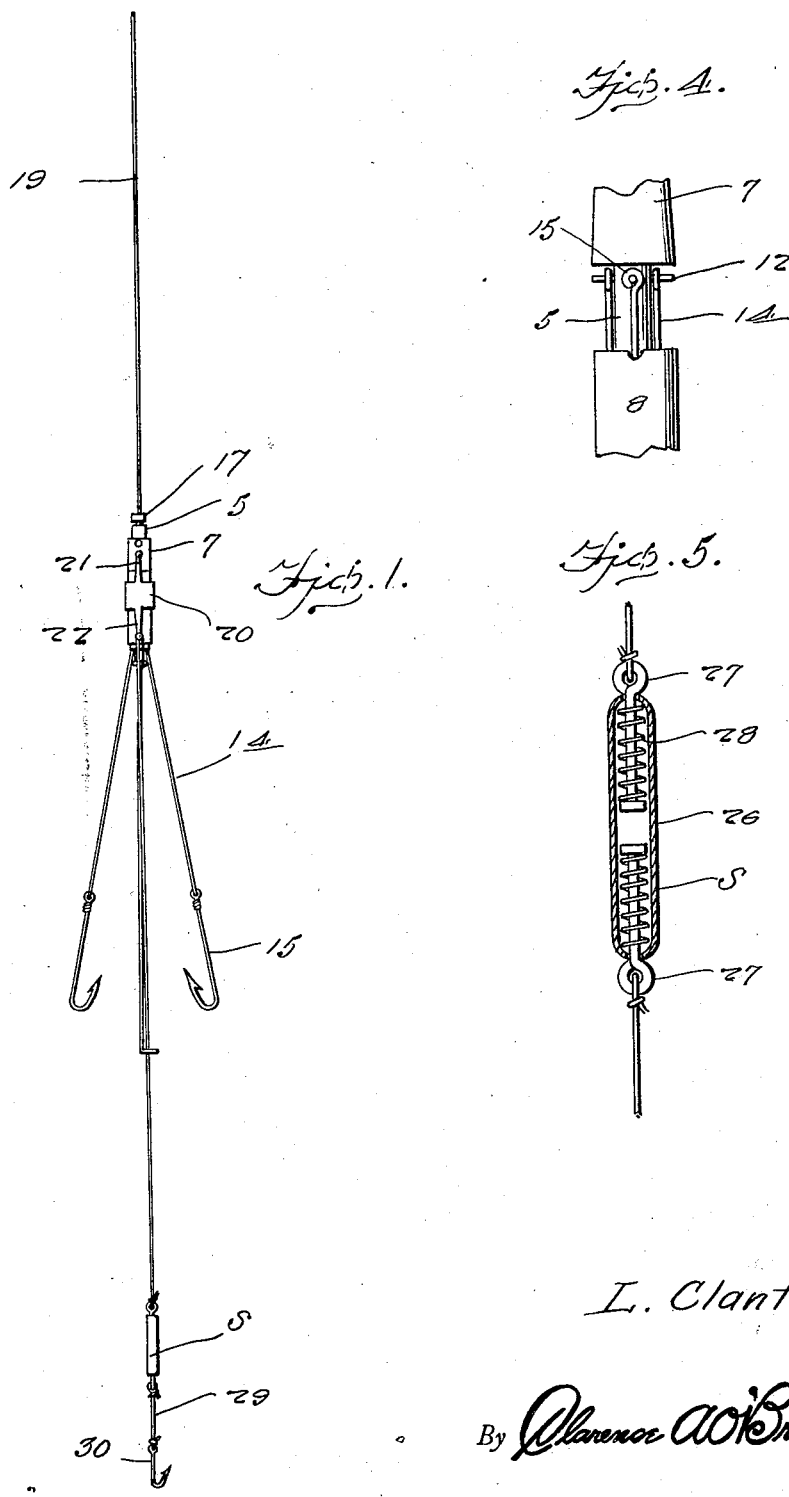
Inventor
L. Clanton
By Clarence A O'Brien
Attorney

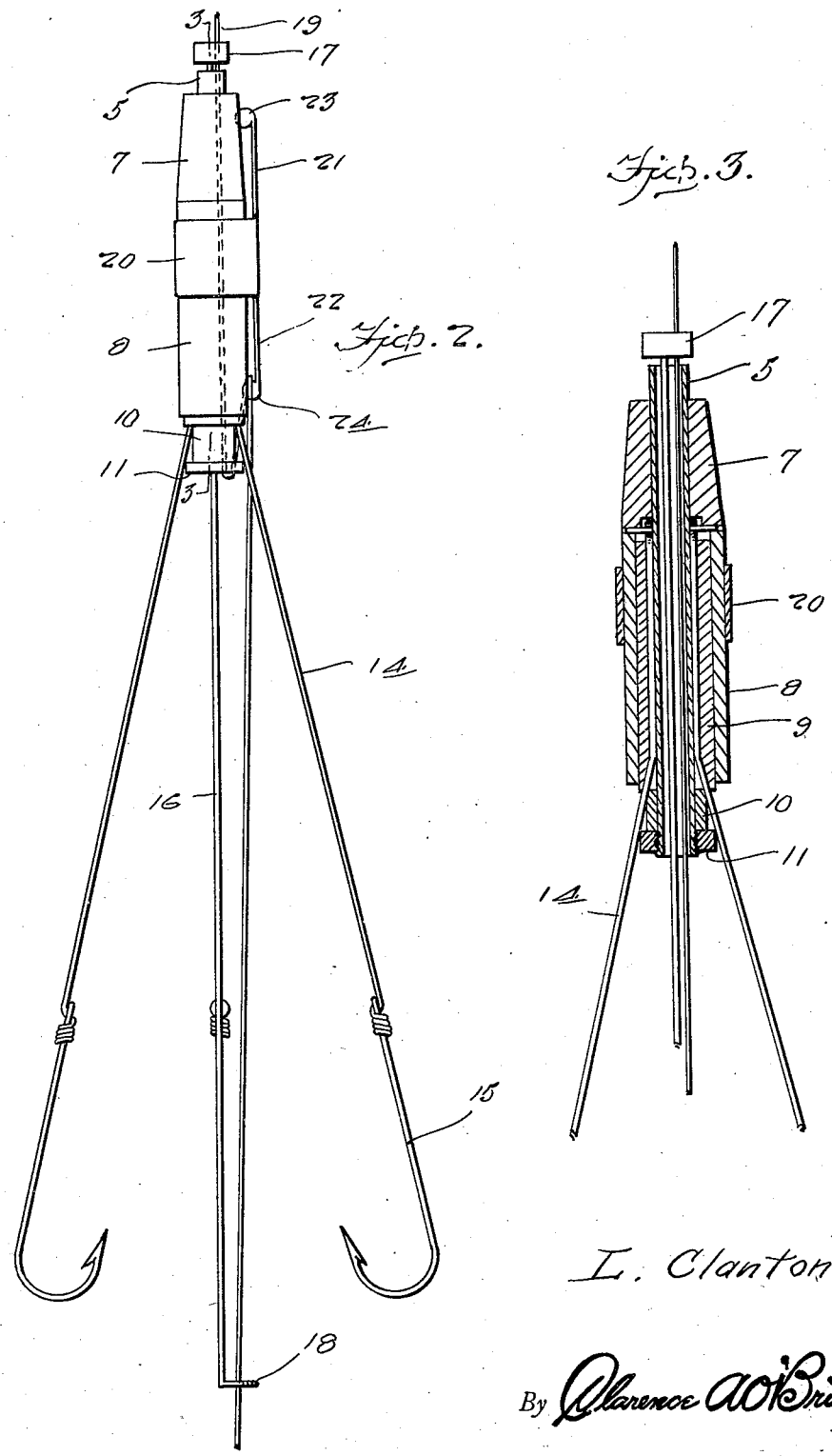

Patented July 16, 1929.

1,721,205

UNITED STATES PATENT OFFICE.

LEE CLANTON, OF ROCKFORD, WASHINGTON.

FISH SNARE.

Application filed May 26, 1928. Serial No. 280,850.

The present invention relates to a fish snare, and the prime object thereof is to provide a device which may be set at any desired distance on the line, above and out of the way of the bait hook and when the bait hook is jerked or tugged by the fish which has the bait hook in its mouth, it will release the device so as to allow the same to gravitate downwardly on the line, and to ensnare the fish with a plurality of hooks.

Another very important object of the invention resides in the provision of a device of this nature having a plurality of spring arms capable of being assembled and disassembled.

A still further very important object of the invention resides in the provision of a device of this nature, which is exceedingly simple in its construction, inexpensive to manufacture, strong and durable, easy to manipulate, and otherwise well adapted to the purpose for which it is designed in its efficiency and reliability.

With the above and numerous other objects in view, as will appear as the description proceeds, the invention resides in certain novel features of construction, and in the combination and arrangement of parts as will be hereinafter more fully described and claimed.

In the drawings:

Figure 1 is an elevation of the device, embodying the features of my invention.

Figure 2 is another view thereof at right angles to that shown in Figure 1.

Figure 3 is a longitudinal detail section taken substantially on the line 3—3 of Figure 2.

Figure 4 is a fragmentary view, showing the slidable sleeve separated from the collar, and Figure 5 is a sectional view through the frame of the device, used in conjunction with the invention.

Referring to the drawing in detail, it will be seen that the numeral 5 denotes an elongated shoe which has fixed about its upper end a collar 7, and slidable over its lower end a sleeve 8 with a bushing 9 therein. A washer 10 and nut 11 hold the sleeve 8 and bushing 9 in place, in abutment against the lower edge of the collar 7. A plurality of pins 12 radiate from the tube 5 immediately below the bottom end of the collar 7.

A plurality of spring rods 14 have their upper ends formed with eyes 15 disposed over the pins 12 and to extend down alongside the tube inside the bushing 9 and then to diverge outwardly from each other and to have hooks 15 secured on their bottom ends. A rod 16 is slidable through the tube and has a head 17 at its upper end, and a guide eye 18, at its lower end. A line 19 extends through the head 17, and continues downwardly through the tube and through the eye 18. A portion of this line is adapted to be fixed, so as to hold the tube in a raised position adjacent the head 17. This is accomplished by means of a ring 20 about the sleeve 8 and having an upwardly extending resilient arm 21 and downwardly extending resilient arm 22. The arm 21 terminates in a ball 23, and the arm 22 terminates in a ball 24 and by reason thereof the ball 23 is held in abutting relation against collar 7, while ball 22 abuts against the sleeve 8. Thus the line may be engaged over the ball 24, clearly shown in Figure 2. A spring device S is at the lower end of the line, and consists of a casing 26, with bolts 27 slidable through the ends thereof and held inwardly of the casing by spring means 28. A line extension 29 is engaged with the lower bolt and supports the hook 30, for the bait. When the fish gets the hook 30 in its mouth and jerks on the line, this line is pulled free from under the ball 24 and thereby allows the tube and parts thereon to gravitate downwardly so that the hooks 15 are disposed about the fish and ensnare it.

It will be seen that by unloosening the nut 11, the sleeve will be slid off of the tube, so as to easily and quickly replace the spring rods 14 whenever necessary or desirable.

It is thought that the construction, operation, utility and advantages of this invention will now be quite apparent to those skilled in this art, without a more detailed description thereof.

The present embodiment of the invention has been disclosed in detail merely for the purposes of exemplification, since in actual practice it attains the features of advantage enumerated as desirable in the statement of the invention and the above description. It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

1. An apparatus of the class described comprising a tube, means for attaching a plurality of spring rods to the tube to extend downwardly therefrom and diverge downwardly from each other, hooks on the lower end of the spring rod, a rod extending through the tube and having a head in its upper end, said line extending down through the tube and having a bait hook at its lower end, and means for securing a portion of the line to the tube to hold the tube in a raised position.

2. An apparatus of the class described comprising a tube, means for attaching a plurality of spring rods to the tube to extend downwardly therefrom and diverge downwardly from each other, hooks on the lower end of the spring rod, a rod extending through the tube and having a head in its upper end, said line extending down through the tube and having a bait hook at its lower end, a clip for securing a portion of the line to the tube to hold the tube in a raised position, and to be released when the line is jerked, so that the tube and adjoined parts will gravitate downwardly.

3. An apparatus of the class described comprising an elongated tube, a collar on the upper end of the tube, a sleeve slidable over the lower end of the tube, means for holding the sleeve in place, said tube having a plurality of pins radiating outwardly therefrom at the lower end of the collar, a plurality of rods receivable in the sleeve about the tube and having eyes to engage over the pins, the lower ends of the rods being extended outwardly and downwardly so as to diverge from one another, a rod through the tube, a line extending through the tube, a clip on the sleeve with which the line may be engaged to hold the tube in a raised position.

In testimony whereof I affix my signature.

LEE CLANTON.